(12) United States Patent
Liu et al.

(10) Patent No.: US 8,023,468 B2
(45) Date of Patent: Sep. 20, 2011

(54) METHODS, DEVICE AND SYSTEM FOR ACCESS POINT FACILITATED FAST HANDOFF

(75) Inventors: Yongqiang Liu, Beijing (CN); Yanfeng Zhang, Beijing (CN); Yong Xia, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 767 days.

(21) Appl. No.: 11/850,969

(22) Filed: Sep. 6, 2007

(65) Prior Publication Data

US 2008/0062933 A1    Mar. 13, 2008

(30) Foreign Application Priority Data

Sep. 7, 2006  (CN) .......................... 2006 1 0126190

(51) Int. Cl.
*H04W 36/00* (2009.01)
(52) U.S. Cl. ...................................... 370/331; 455/436
(58) Field of Classification Search .................. None
See application file for complete search history.

(56) References Cited

U.S. PATENT DOCUMENTS

| | | | | |
|---|---|---|---|---|
| 6,393,261 | B1 * | 5/2002 | Lewis ........................... | 455/103 |
| 7,302,256 | B1 * | 11/2007 | O'Hara et al. ................. | 455/418 |
| 7,340,247 | B1 * | 3/2008 | O'Hara et al. ................. | 455/418 |
| 7,457,620 | B2 * | 11/2008 | Lam et al. ...................... | 455/434 |
| 2005/0047371 | A1 | 3/2005 | Bennett | |
| 2005/0053043 | A1 * | 3/2005 | Rudolf et al. ................. | 370/337 |
| 2005/0255847 | A1 * | 11/2005 | Han et al. ....................... | 455/436 |
| 2006/0056367 | A1 * | 3/2006 | Marinier et al. .............. | 370/338 |
| 2006/0072507 | A1 | 4/2006 | Chandra et al. | |
| 2006/0092883 | A1 | 5/2006 | Lee | |

(Continued)

FOREIGN PATENT DOCUMENTS

JP    2004-514309 A    5/2004

(Continued)

OTHER PUBLICATIONS

Ok et al. "Design and Implementation of Real-Time Channel Scanning Mechanism Using Shared Beacon Channel in IEEE 802.11 Wireless Lan", Technical Report of IEICE (Institute of Electronics, Information and Communication Engineers), pp. 305-310, Mar. 2006.

(Continued)

*Primary Examiner* — Robert Scheibel
(74) *Attorney, Agent, or Firm* — Sughrue Mion, PLLC

(57) ABSTRACT

Methods, devices and system for access point facilitated fast handoff are provided. Each access point (AP) in a wireless local area network is provided with a primary interface and a secondary interface wherein the primary interface performs normal communication with user terminals and broadcasts standard beacon frames on its working channel, and the secondary interface broadcasts extended beacon frames on working channels of neighbor APs sequentially. The extended beacon frame includes at least information of BSSID, SSID, working channel and the like of the primary interface of the corresponding AP. The user terminal may receive the standard beacons from the serving AP it is communicating with and the extended beacons from the neighbor APs, and according to the two kinds of beacons, the terminal may calculate the signal quality with the primary interface of the serving AP and the signal qualities with the neighbor APs at the current position. By an algorithm of comparing the signal qualities of the best neighbor AP and the serving AP, the terminal may accurately and quickly determine whether to perform handoff with minimized cost.

36 Claims, 7 Drawing Sheets

U.S. PATENT DOCUMENTS

| | | | |
|---|---|---|---|
| 2006/0171357 A1* | 8/2006 | King et al. ............. | 370/331 |
| 2007/0014267 A1* | 1/2007 | Lam et al. ............. | 370/338 |
| 2007/0047492 A1* | 3/2007 | Kim et al. ............. | 370/331 |
| 2007/0223432 A1* | 9/2007 | Badarinath ............. | 370/338 |
| 2008/0049702 A1* | 2/2008 | Meylan et al. ............. | 370/342 |

FOREIGN PATENT DOCUMENTS

| | | |
|---|---|---|
| JP | 2005-518702 A | 6/2005 |
| JP | 2005-524366 A | 8/2005 |
| WO | 2004/054283 A2 | 6/2004 |

OTHER PUBLICATIONS

Brik et al. "Eliminating Handoff Latencies in 802.11 WLANs Using Multiple Radios: Applications, Experience, and Evaluation", in ACM/USENIX Internet Measurement Conference (IMC) Oakland, CA, Oct. 2005).

Shin et al., Reducing MAC Layer Handoff Latency in IEEE 802.11 Wireless Lans, Proceedings of the Second International Workshop on Mobility Management and Wireless Access Protocols, Philadelphia, USA, 2004.

Shin et al., Improving the Latency of 802.11 Hand-offs Using Neighbor Graphs, In Proceeding of the ACM MobiSys Conference, Boston, MA, USA Jun. 2004.

Ramani et al., SyncScan: Practical Fast Handoff for 802.11 Infrastructure Networks, in Proceedings of the IEEE Infocom Conference 2005, Miami, FL, Mar. 2005.

Vivek Mhatre etal., Using Smart Triggers for Improved User Performance in 802.11 Wireless Networks in Processing of the ACM MobiSys Conference, Uppsala, Sweden, Jun. 2006.

* cited by examiner

| BSSID of neighbor APs | Working channels of primary interface of neighbor APs |
|---|---|
| xx:xx:xx:xx:xx:xx | 2 |
| yy:yy:yy:yy:yy:yy | 6 |
| zz:zz:zz:zz:zz:zz | 9 |

METHODS, DEVICE AND SYSTEM FOR ACCESS POINT FACILITATED FAST HANDOFF

FIELD OF THE INVENTION

The invention relates generally to wireless communication, and more particularly to methods, device and system for fast link-layer handoff to minimize communication disruption period which occurs when a user terminal (STA) moves away from its current associated access point (AP) to another nearby AP.

BACKGROUND

IEEE 802.11 standard defines two operating modes: an ad hoc mode and an infrastructure mode. In the ad hoc mode, two or more STAs can recognize each other and establish a peer-to-peer communication without the need of an AP. In the infrastructure mode, there is at least one AP. The AP and one or multiple STAs it supports are known as a Basic Service Set (BSS), which roughly corresponds to a cell in cellular network environment. A STA uses the AP to access the resources of a wired network, as well as to communicate with other STAs within the same BSS. The wired network can be an organization intranet or the Internet, depending on the placement of the AP. A set of two or more BSSs connected by a distributed system (DS) form an Extended Service Set (ESS), identified by its Service Set Identifier (SSID). If the radio coverage areas of two APs overlap, handoff occurs when a STA moves out of the coverage area of an AP and enters that of another AP.

The handoff procedure involves a sequence of actions and messages exchanged by the STA and neighbor APs, resulting in the transfer of STA's connection from the serving AP to a new AP. During this period, the communication link between the STA and the serving AP is broken, and the STA is not able to send or receive any data packet until establishing a new link with the new AP. So, there is a communication disruption period as illustrated in FIG. 1, which starts from the time the existing communication link is broken to the time when the new link is established. The STA initiates the handoff procedure when it detects that the link quality with the serving AP has degraded below a specific threshold.

As shown in FIG. 1, the communication disruption period is comprised of a scanning process (also called discovery process) and an authentication and re-association process. During the scanning process, the STA needs to switch to each radio frequency (channel) to discover whether there is any AP working on this channel. This scanning process can take up to several hundred milliseconds and occupy over 90% of the whole handoff latency. The authentication and re-association process takes only a few milliseconds to complete.

The channel scanning process can be accomplished in passive or active mode. With passive scanning, STA switches to each candidate channel and listens to periodic beacon frames from APs. An AP uses beacon to announce its presence, its working channel, its BSSID and other parameters for STA's access. The AP broadcasts its beacons periodically (typically every 100 ms). So, to get information about all the APs in a certain channel, the STA has to stay in the channel for at least a beacon period. Comparatively, with active scanning, STA broadcasts Probe Requests in each candidate channel and waits for Probe Responses from neighbor APs working on that channel. An AP sends unicast Probe Response to the STA after receiving the Probe Request. The Probe Response frame carries the same parameters as in the beacon frame. In both cases, after scanning all candidate channels, STA selects the best AP from the records to perform the second process—authentication and re-association.

Due to limited coverage of a BSS, the time for a mobile user to stay in a cell may be on the order of only several minutes, or even a few seconds, depending on its moving speed. Real-time interactive applications have strict quality requirement. For example, VoIP requires its end-to-end delay to be lower than 250 ms, delay variance or jitter lower than 50 ms, and packet loss rate less than 1%. However, with the standard 802.11 protocol, the handoff process cannot satisfy the requirements of real-time interactive applications for the following two reasons:

(1) the communication disruption period is too long (about 500 ms); and (2) the long communication disruption causes packet loss.

Offering real time handoff is an essential requirement for VoIP and other real time services like video conference. How to provide fast link-layer handoff in WLAN environment is an active research subject, and there are already some related inventions to reduce the handoff latency. Since the scanning process dominates the communication disruption period of a handoff, almost all these inventions attempt to shorten this process. According to the said two modes of scanning process, these inventions fall into two categories: 1) active scanning; and 2) passive scanning.

Active scanning is further categorized as full-scanning and selective-scanning according to the number of scanned channels. Full-scanning is a brute force scheme that probes all the legitimate channels (for example, all eleven channels for 802.11b). Selective-scanning, on the other hand, limits scanning to a subset of legitimate channels. The latency of active scanning is affected significantly by two parameters: the probe count and the probe wait time. Most of inventions using active scanning intent to decrease the probe count. An example is Reference 1 (PCT international publication WO2004/054283A2 by Zhong et al., entitled "System and Method for Performing a Fast Handoff in a Wireless Local Area Network"), which discloses a system and method using a table of pre-configured nearest-neighbor APs to perform a prioritized scanning in the communication disruption period. In Reference 2 (S. Shin, A. Forte, et al., "Reducing MAC layer Handoff Latency in IEEE 802.11 Wireless LANs." in Proceedings of the Second International Workshop on Mobility Management and Wireless Access Protocols, Philadelphia, USA, 2004), selective scanning and "AP cache" which records the scan results of last scanning are used to realize a link-layer fast handoff. The probe count and the probe wait time are reduced in Reference 3 (M. Shin, A. Mishra, and W. Arbaugh, "Improving the Latency of 802.11 Handoffs using Neighbor Graphs," in Proceedings of the ACM MobiSys Conference, Boston, Mass., USA, June 2004) by using neighbor graphs and non-overlap graphs. The neighbor graphs construction and probing method is also presented in Reference 4 (US2006/0092883A1). Reference 5 (US2006/0072507A1, entitled "Minimizing Handoffs and Handoff Times in Wireless Local Area Networks") presents a method, in which the number of channels that are scanned during a handoff is reduced by tracking past user movements within the WLAN.

Some inventions strive to improve the performance of passive scanning. SyncScan in Reference 6 (Ishwar Ramani, and Stefan Savage, "SyncScan: Practical Fast Handoff for 802.11 Infrastructure Networks," in Proceedings of the IEEE Infocom Conference 2005, Miami, Fla., March 2005) synchronizes the short listening periods at the STA with regular periodic beacon transmission from all the APs. With the knowledge of when the APs on a certain channel will broadcast their beacons, STA can switch to the channel at a particular time and get all broadcasting beacons from these synchronized APs without waiting for a full beacon period. Since it takes very short time to scan a channel, the STA can perform the scanning process before breaking its current connection with its serving AP. The handoff latency is consequently shortened greatly. In Reference 7 (US2005/0047371A1 by Richard L. Bennett, entitled "Passive Probing for Handoff in a Local Area Network"), the serving AP has responsibility to send probe requests to its neighbor APs and inform them of a defined time and a response interval at which they transmit their probe responses. STA is also informed by its serving AP of the defined time, the response interval and the defined channel at which it can hear the probe response from one of its neighbor APs. With the probe responses, the STA can make a decision about when to handoff and which neighbor AP to handoff to. In Reference 8 (Vivek Mhatre, and Konstantina Papagiannaki, "Using Smart Triggers for Improved User Performance in 802.11 Wireless Networks," in Processing of the ACM MobiSys Conference, Uppsala, Sweden, June 2006), a mechanism is adopted by which STA can hear the beacon from its neighbor APs on the same or overlapping channels with its current channel. Then with a complementary algorithm, the STA can make the right decision which neighbor AP can provide better link quality.

An approach called MultiScan is proposed in Reference 9 (V. Brik, A. Mishra, and S. Banerjee, "Eliminating handoff latencies in 802.11 WLANs using multiple radios: Applications, experience, and evaluation," in ACM/USENIX Internet Measurement Conference (IMC), Oakland, Calif., October 2005), which relies on double interfaces in each STA to realize seamless handoff. MultiScan nodes use their (potentially idle) second wireless interface to opportunistically scan and pre-associate with alternate APs and eventually seamlessly handoff ongoing connections, while its first interface keeps communication with its serving AP.

A real-time channel scanning mechanism is proposed in Reference 10 (J. Ok, S. Komorita, A. Darmawan, H. Morikawa, and T. Aoyama, "Design and Implementation of Real-time Channel Scanning Mechanism using Shared Beacon Channel in IEEE 802.11 Wireless LAN," technical report of the Institute of Electronics, Inforamtion and Communication Engineers, Technical Committee on Information Networks (IN2005-208), pp. 305-310, March 2006). In this solution, a shared channel named Beacon-Channel (utilizing channel 14 in the algorithm) is used to eliminate the time-consuming channel scanning. Each AP periodically transmits extended format beacons, called eBeacon, in a Beacon-Channel via an extra interface. As long as a STA has an extra receiver which is tuned to Beacon-Channel, it is able to keep updating eBeacons and tracing the signal quality of neighbor APs.

In all the active scanning methods above, the scanning process keeps in the communication disruption period. That is to say, these methods still conform to the pattern illustrated in FIG. 1. Although being shortened, the channel scanning process still contributes dominating latency for the disruption period. Moreover, with these methods, STA cannot monitor signal qualities of nearby APs continuously, so it may initiate scanning only when the signal with the serving AP has degraded below a threshold, with which connection has to interrupt or endures poor and unsustainable performance, even if there exists a nearby AP with better link quality. Therefore, the STA cannot always choose the best AP to make association with. After scanning, the STA chooses the best AP only according to the one-time sampling result, so the temporary fluctuation of signal can put some influence on the correctness of the AP selection.

SyncScan and the method in Reference 7 can enable STA to monitor the qualities of nearby APs continuously, so that the STA can evaluate the quality of an AP based on average signal quality, and can make choice of the best AP even before the current link turns into poor and unsustainable performance. But both of them require precise synchronization mechanism to enable neighbor APs to send out beacons or probe responses at the right time and to enable STA to hear the beacons or probe responses at the exact moment that neighbor APs send out beacons or probe responses. If the STA, the serving AP, and the neighbor APs are out of sync with each other, beacons from nearby APs will be missed by STA, which will put bad impact on the handoff performance and obstruct the STA from finding the best neighbor AP timely. In large-scale wireless network, it is very difficult to make all APs and STAs synchronized with high time precision. Moreover, to prevent packet loss during scanning process, STA must implement buffering mechanism and send PSM data to AP periodically. It results in significant power consumption in STA.

In order to reduce the co-channel interference, people try to use non-overlapped channels to cover a certain area, such as channel 1, 6 and 11 for 802.11b. It is very different with the assumption presented in Reference 8. Reference 8 assumes there always exist multiple neighbor APs operating in the overlapped channel with the serving AP. Therefore, if there is no neighbor AP operating in the overlapped channel, it is impossible for the STA to find an available AP to connect with. For example, if a STA communicates with its serving AP in channel 1 and neighbor APs operate in channel 6 and 11, the STA will use the standard 802.11 handoff procedure. On the other hand, even if there exist some neighbor APs in an overlapped channel, the STA often can't find the best AP to connect with, since it can only get the information about its neighbor APs on the same or overlapped channel.

Two interfaces in a STA as presented in Reference 9 can make the handoff process completely seamless, but this adds one more apparatus. And, the current reality is that most of the portable terminals are equipped with only one interface. Two interfaces in a STA can also cause more power consuming than a single interface, and the kernel of the STA with two interfaces needs to be modified to make choice which interface should be used for upper layer traffic.

The solution proposed in Reference 10 also requires a STA equipped which two interfaces. The limitations of two interfaces on the STA have been addressed above. Moreover, utilizing channel 14 as the necessary Beacon-Channel is not full compatible with existing 802.11 systems. Further, since channel 14 is the channel allowed for IEEE 802.11b only in Japan, the regions the method can be used is limited.

SUMMARY OF THE INVENTION

In summary, although some proposed solutions have decreased the handoff latency, there is a significant deployment hurdle before these approaches are available for 802.11 wireless systems in use today. In fact, considering a huge number of uncontrollable STAs and the cost of upgrading them, a more feasible solution should not require significant modifications on the terminals. Such modifications include, for example, installing two interfaces on a STA, complicated buffering and power-consuming scanning mechanism, and so on. Distinguished from the existing solutions, this invention presents a novel method and system for performing fast link-layer handoff, with which STA can always choose the best quality AP to connect, and the latency and packet losses during handoff can be minimized. At the same time, the method and system of the invention requires minimum modification on STA, and also can eliminate the power consuming for STA in the scanning process.

In the solution of the invention, the most of handoff functionalities are placed in AP by adding to AP another wireless interface, which takes responsibility for broadcasting extended beacon frames alternately on the channels that neighbor APs work on. Therefore each AP is equipped with two wireless interfaces: one is called primary interface (PI), the other secondary interface (SI). The primary interface keeps performing the normal functions of a standard 802.11 access point. The secondary interface works as the announcing agent of the primary interface in the same AP. It only broadcasts extended beacon frames periodically.

Briefly speaking, the technical solution of the invention has the following features:
(1) by using the secondary interface, each AP periodically switches channel and broadcasts extended beacons according to a neighbor list; and
(2) by continuously monitoring the extended beacons from neighbor APs and the serving AP, STA can make a precise handoff decision. No extra interface and complicated scanning mechanism are required for STA.

While moving away from the serving AP, a STA can hear the beacons from neighbor APs and its serving AP without changing its working channel and without disrupting its ongoing communication. Since the secondary and primary interfaces of an AP locate near enough, the extended beacons sent out by the secondary interface experience almost the same path attenuation as that of the beacons sent out by the primary interface. Upon receiving the extended beacons of a neighbor AP, the STA can calculate the signal quality of the primary interface of that neighbor AP. Moreover, the STA can also learn the BSSID and the working channel of the primary interface of that neighbor AP. When the STA decides to handoff, the actual handoff process only includes the "authentication and re-association" process and can be performed in just a few milliseconds.

Compared with the standard approach, the invention reduces handoff delay by over an order of magnitude. This reduction is sufficient to preserve the illusion of continuity needed by interactive voice application. Moreover, the solution and system of the invention is easier to deploy. In addition, the invention also has the following positive effects:
(1) a continuous monitoring implementation allows terminals to perform handoff more accurately and STA can always connect to best AP around it before the associated AP's signal has degraded below the worst threshold;
(2) no buffer mechanism is needed for both inbound and outbound data during scanning process;
(3) by using passive scanning, STA needs not to send any packets, and thereby the power consumption caused by scanning process of portal terminals can be minimized; and
(4) since the most of handoff tasks is performed by APs, the minimal modification on STA is simple and open, and therefore the cost of frequent updating of software of STAs is cut down.

BRIEF DESCRIPTIONS OF THE DRAWINGS

The above and other objects, features and advantages of the present invention will be fully understood from the following description, taken in conjunction with the accompanying drawings in which like reference numerals refer to like parts and in which.

Figures 9, 10:
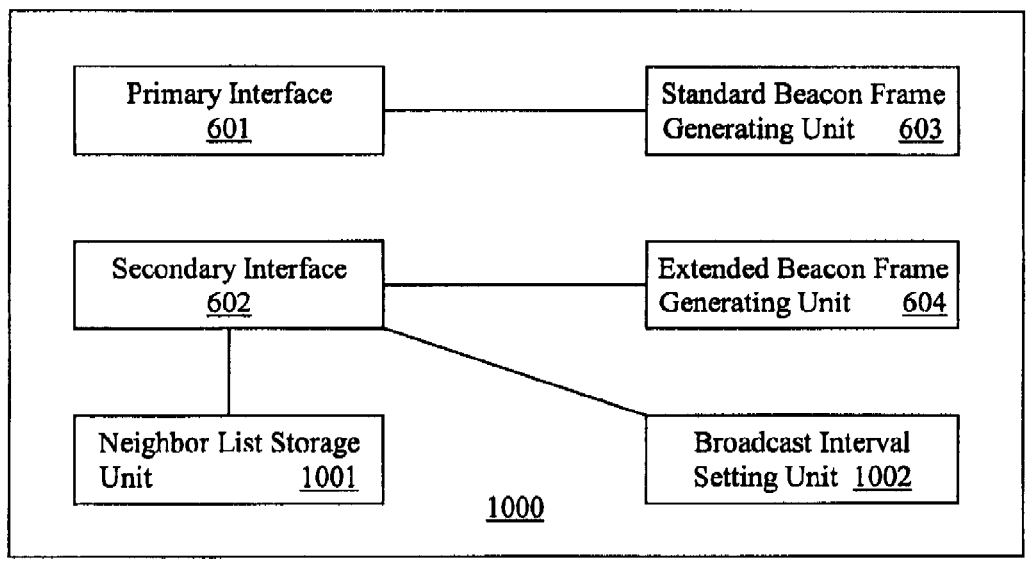
FIG. 9 is an example of the neighbor list.
Figure 11:
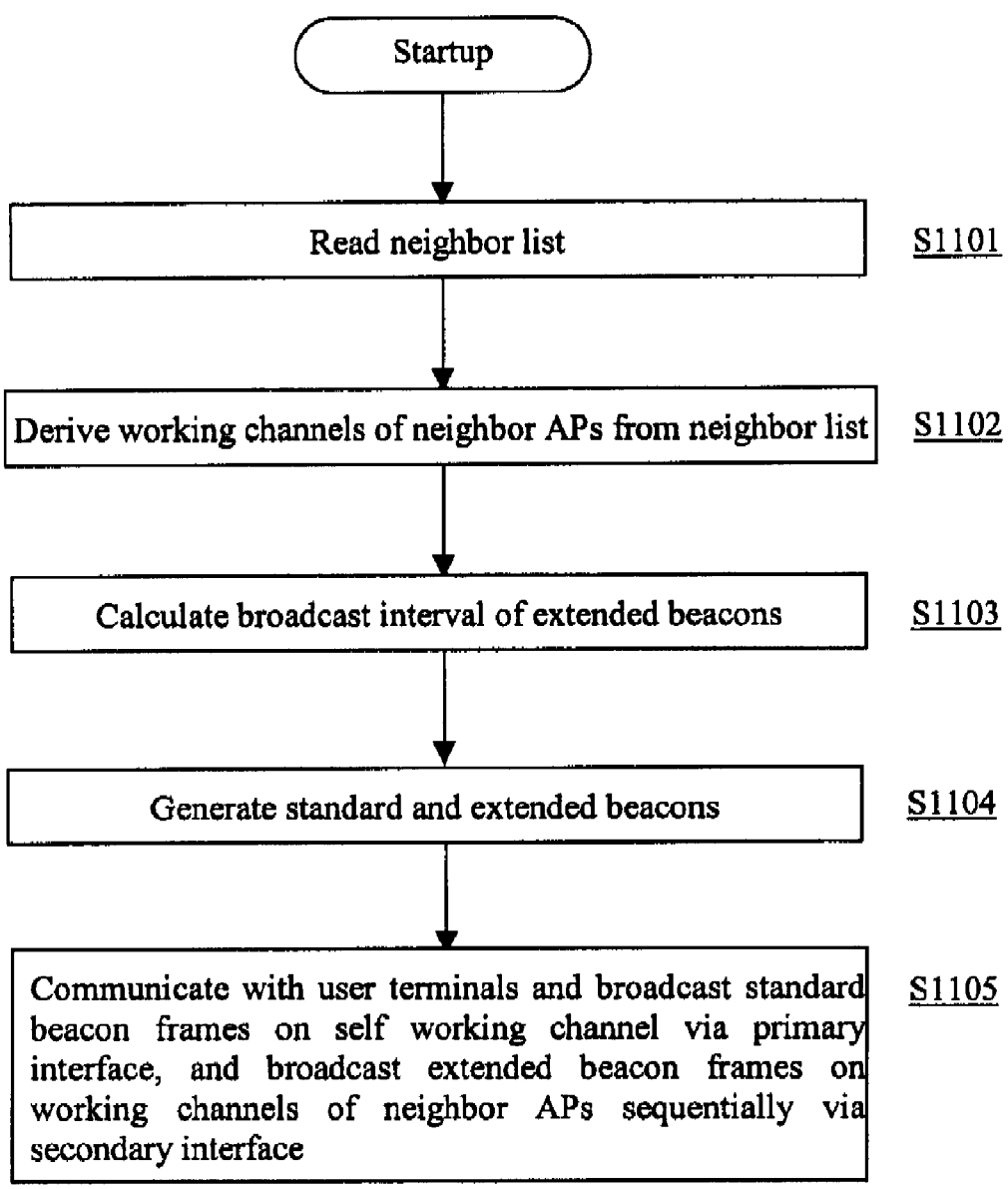

FIG. 10 a block diagram schematically illustrating the configuration of an AP according to one embodiment of the invention; and FIG. 11 is a flow chart illustrating the operation of an AP according to one embodiment of the invention.

DETAILED DESCRIPTION OF THE PREFERRED EMBODIMENTS

The present invention provides methods, devices and systems for performing fast link-layer handoff of wireless service between APs of a wireless network.

In overview, the present invention relates to wireless communications devices or units and wireless communication systems. The former is often referred to as client stations (STAs), such as laptop, PDA, smart phone equipped with WLAN interface, and so on. The latter is often referred to as access points (APs) and the network behind them, which provides services such as video, voice and data communications to STAs. More particularly, various inventive concepts of the invention are embodied in STAs and APs as well as methods used therein for providing a handoff of video, voice and data communications services between APs of a wireless network through AP based pre-break scanning. AP based pre-break scanning is defined as such means by which an AP, equipped with two wireless interfaces, periodically use its secondary interface to broadcast extended beacon frames on the channels neighbor APs working on, and STAs can monitor these beacons while keeping its communication with a serving AP.

The communication system and STAs of particular interest are those that may provide or facilitate short range communications capability normally referred to as WLAN capabilities, such as IEEE 802.11, Bluetooth, or HiperLAN and the like that preferably utilize orthogonal frequency division multiplex (OFDM), code division multiple access (CDMA) and frequency hopping access technologies.

Figure 1:
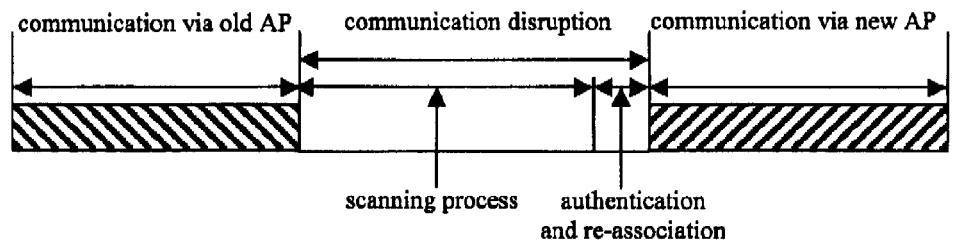
FIG. 1 is a diagram illustrating the communication disruption caused by traditional 802.11 handoff.
Figure 2:
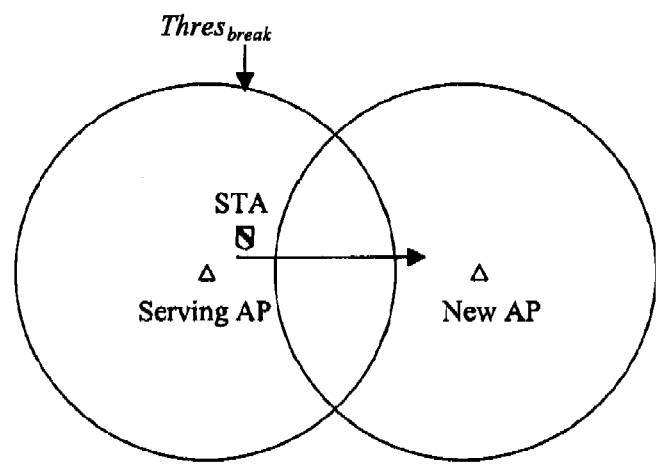
FIG. 2 is a diagram schematically illustrating the overlapped coverage of two APs.

In such a system, for providing high user capacity within a limited spectrum, a plurality of APs are needed so as to provide many low powered cells, each covering only a small portion of the service area. Due to the limited coverage of each cell, STA often moves into a different cell while a session is in progress, so a handoff process is needed to identify the next AP and transfer the on-going session. To enable STA handoff from the coverage of a serving AP to the coverage of another AP, the coverage of the two APs must be overlapped as shown in FIG. 2. It means that there must be a common area between the coverage of the two APs, in which STAs can selectively build connection and communicate with either of the two APs. In the present invention, if two APs are overlapped, one of them is called as a neighbor of the other, and vice versa.

The fundamental problem behind today's handoff mechanisms can be attributed to the fact that STA triggers a handoff event upon loss of connectivity or poor and unsustainable performance, and scanning process takes most of the time of the communication disruption period. When a STA is about to handoff, it has already been experiencing poor performance before breaking the current connection, and after breaking the current connection, it needs to scans all possible channels to collect information about neighbor APs. As illustrated in FIG. 2, when a STA moves away from a serving AP, the Received Signal Strength Indicator (RSSI) of the serving AP drops gradually. When the RSSI of the serving AP turns lower than a threshold $Thres_{break}$ (the lowest RSSI value with which STA can maintain communication), the STA triggers handoff, breaks the on-going connection and begins to scan neighbor APs. $Thres_{break}$ also indicates the border of the AP's coverage.

In the method of the invention, it is suggested that STAs should not wait until they lose connectivity or experience poor performance to seek alternative APs. In other words, STAs should be proactive, and not reactive to poor performance. The channel scanning, the scanning result evaluation and the best candidate AP selection should be accomplished before breaking the current connection. Therefore, if there exists a neighbor AP, which can provide better link quality than the serving AP, STA can always discover and connect with it before the STA's current link quality drops into a very poor status. Thus when the STA find a better AP, the handoff only consists of detaching from the serving AP (i.e., breaking), switching channel, making authentication and re-association with the new AP, so the handoff can be minimized.

Figure 3:
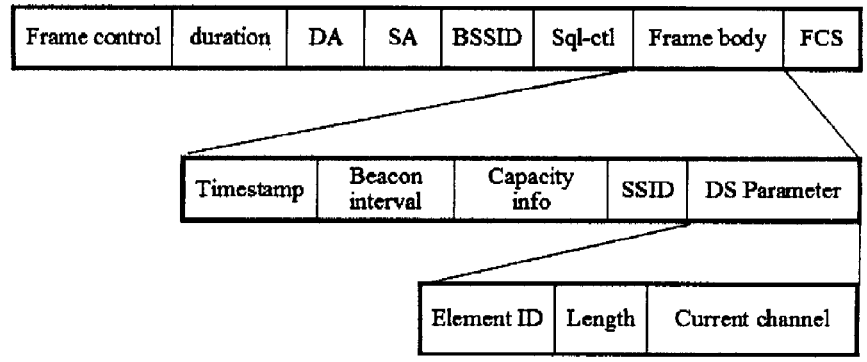
FIG. 3 is a diagram showing a standard 802.11 beacon frame.

In a standard 802.11 infrastructure network, AP is responsible for transmitting beacon frames. The area in which beacon frames appear defines the basic service area. All communication in an infrastructure network is done through APs, so STA on the network must be close enough to hear the beacons. Beacons are broadcasted at regular intervals to allow STAs to find and identify the basic service area. FIG. 3 shows a standard 802.11 beacon frame. Regularly, an AP has only a wireless interface, via which all data, control and management frames (including beacon frames) are sent or received, so the BSSID in the beacon frame is just the MAC address used by this wireless interface in the AP, and the current channel, included in the DS parameter field, is just the working channel of this wireless interface.

Figure 4:
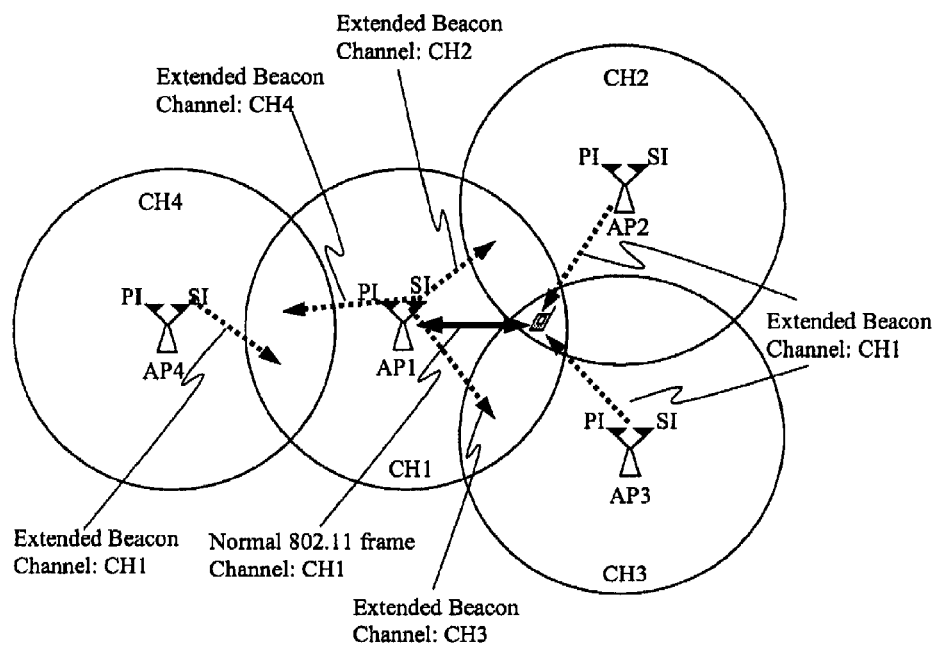
FIG. 4 is a diagram schematically illustrating an example of the wireless communication system taking use of AP facilitated pre-break scanning according to the invention.

FIG. 4 shows an example of the system taking use of AP facilitated pre-break scanning according to the invention. As shown in the drawing, every AP (AP1, AP2, Ap3, AP4) in the system has two interfaces: a primary interface (PI) and a secondary interface (SI). An AP uses its primary interface PI to build a BSS, and the primary interface performs the normal functions of a standard 802.11 access point, which include standard beacon broadcasting, management of authentication and association, and bridging of data traffic. The secondary interface SI, however, is not engaged into the bridging of data traffic and other management function except for working as an announcing agent of the primary interface in the same AP by broadcasting beacons periodically. Any data frames and management frames except for beacons cannot be sent or received via the secondary interface. As the announcing agent of the primary interface, the secondary interface broadcasts the information of the primary interface, such as BSSID, capacity info, SSID and working channel of the primary interface, rather than information about itself, so the beacon frames from the secondary interface are modified as shown in FIG. 5.

Figure 5:
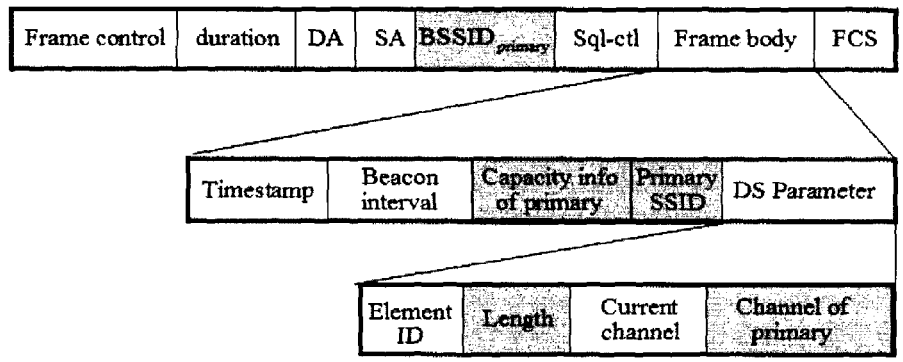
FIG. 5 is a diagram illustrating an example of the extended beacon according to the invention.

FIG. 5 illustrates an extended beacon frame from the secondary interface according to one embodiment of the invention. The BSSID, capacity information and SSID fields in standard 802.11 beacon frame are respectively filled with the MAC address of the primary interface, the data rates the primary interface supports, and the SSID used by the primary interface to identity its own BSS. For the DS parameter field, a new sub-field (channel of primary) is appended, which represents the working channel of the primary interface. Accordingly, the length value in the DS parameter field is changed from 1 to 2. It should be noted that the extended beacon applicable in the invention is not limited to the particular example shown in FIG. 5. Any suitable extended beacon can be designed according to the particular requirement as long as necessary information about the primary interface can be derived therefrom.

Referring back to FIG. 4, the secondary interface of an AP broadcasts the extended beacons on different channels periodically instead of on an unchanging channel, so as to enable STAs, which are associating with neighbor APs and locate in the overlapped area of that AP and other APs, to hear the extended beacons. The primary interface keeps broadcasting standard 802.11 beacons at a regular frequency (100 ms beacon period by default).

For example, as shown in FIG. 4, the working channels of the access points AP1-AP4 (working channels of the primary interfaces) are CH1-CH4, respectively. The primary interface PI of AP1 broadcasts standard beacons on the working channel CH1 of AP1, while the secondary interface SI broadcasts extended beacons on the working channels CH2, CH3 and CH4 of the neighbor access points AP2, AP3 and AP4 sequentially. Please note that although four APs are shown, the system according to the invention may comprise any number of APs, and the working channels of any two APs may be different from each other or be overlapped.

If a STA moves into the common overlapped area of its serving AP and an neighbor AP(s), it can hear not only the standard beacons from the primary interface of its serving AP, but also the extended beacons from the secondary interface(s) of the neighbor AP(s). For example, as shown in FIG. 4, the STA currently communicating with AP1 can hear, on the working channel of AP1, not only the standard beacons from the primary interface of AP1, but also the extended beacons from the secondary interfaces of AP2 and AP3.

For the secondary and primary interfaces of an AP which locate near enough with each other, the extended beacons sent out by the secondary interface experience almost the same path attenuation as that of the beacons sent out by the primary interface. Therefore, after receiving the extended beacons from the secondary interface of a neighbor AP, STA can decide the signal quality of the primary interface of the same neighbor AP. From the extended beacon frames, STA can also learn the BSSID, SSID, capacity information and the working channel of the primary interface of the neighbor AP.

From the standard beacons sent from the serving AP, STA can sample the RSSI of the serving AP, and with enough samples, the moving average RSSI value of the serving AP ($RSSI_{curr}$) can be calculated. Similarly, the STA can sample and calculate the moving average RSSI value of each neighbor AP from the extended beacons sent from the neighbor APs.

When the signal quality of the serving AP degrades such that it is necessary to prepare for handoff, the STA chooses a candidate AP based on the results of the above calculation and decides whether to perform handoff. In particular, when the signal quality of the serving AP drops below a predetermined threshold (the threshold is greater than the above mentioned $Thres_{break}$), the STA may select the best neighbor AP (whose average RSSI is $RSSI_{best}$) by comparing the average RSSIs of neighbor APs. With the result of sampling and averaging, if the RSSIs of the neighbor APs and the serving AP meet the conditions as follows (where $\Delta$ is a margin, used to avoid the unnecessary handoff operations that might produce a "ping-pong" effect when the STA are equally well served by different APs):

$$RSSI_{best} - RSSI_{curr} > \Delta \quad (1)$$

the STA chooses the best neighbor AP as the candidate AP to connect. Based on the selected candidate AP, the STA breaks the connection with the serving AP and makes authentication and re-association with the best neighbor AP. Thereby, the total latency of handoff process consists of just three parts: channel switch and transmission (CS&T), authentication ($t_{auth}$) and re-association ($t_{assoc}$).

$$t_{handoff} = CS\&T + t_{auth} + t_{assoc} \quad (2)$$

where CS&T is an inherent value (about 5-7 ms) for a WLAN card. Authentication is required to validate the STA's right to use a particular AP, and with opening system, authentication ($t_{auth}$) takes about 3-5 ms to finish. $t_{assoc}$ is the time used by the STA to rebuild association relationship with a new AP, and costs about 3-5 ms. Therefore with this method, the total handoff latency can be cut down to less than 20 ms.

Figure 6:
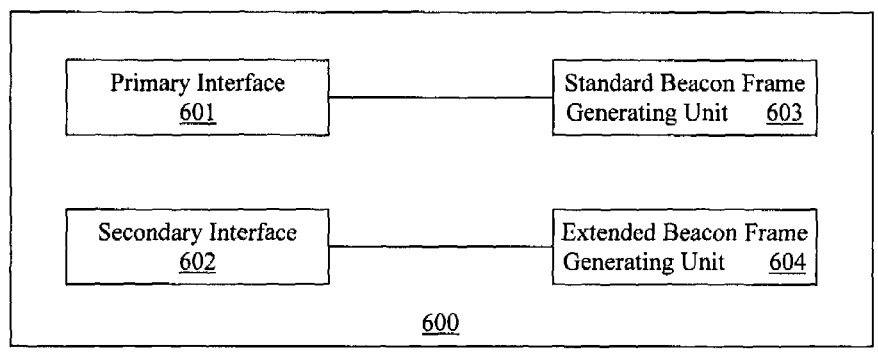
FIG. 6 is a block diagram schematically illustrating the configuration of an AP according to one embodiment of the invention.

FIG. 6 shows the configuration of an AP according to one embodiment of the invention. AP 600 mainly comprises a primary interface 601, a secondary interface 602, a standard beacon frame generating unit 603 and an extended beacon frame generating unit 604. The standard beacon frame generating unit 603 and the extended beacon frame generating unit 604 are used for generating standard beacon frames and extended beacon frames, respectively. AP 600 performs normal communication with STAs within the coverage area via the primary interface 601, and broadcasts the standards beacons on its working channel via the primary interface 601. AP 600 broadcasts the extended beacons on the working channels of neighbor APs sequentially by using the secondary interface 602. Although not shown, AP 600 may also comprise other known components for access point, such as a memory for storing data, a controller for controlling the operation of each part, and so on.

Figure 7:
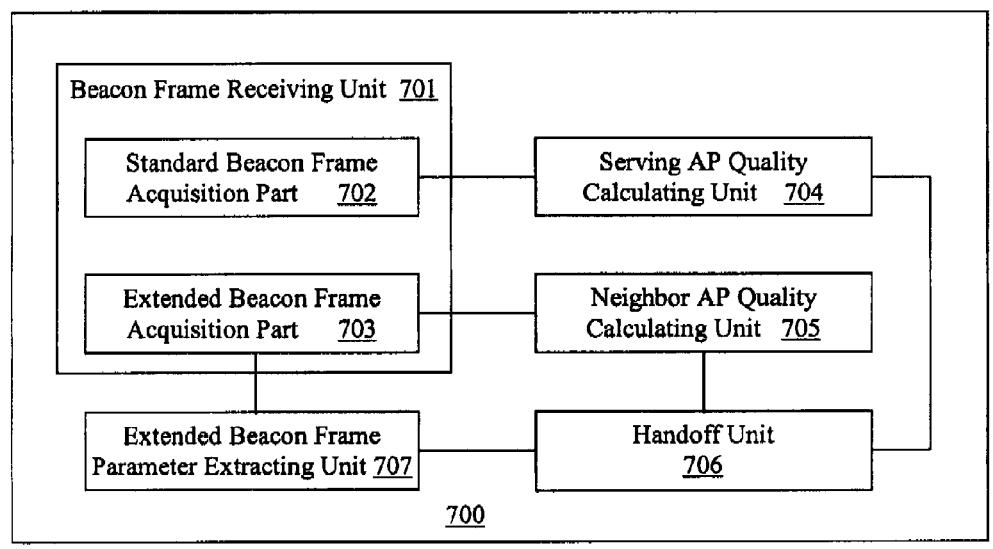
FIG. 7 is a block diagram schematically illustrating the configuration of a user terminal according to one embodiment of the invention.

FIG. 7 shows the configuration of a user terminal according to one embodiment of the invention. As shown in FIG. 7, STA 700 mainly comprises a beacon frame receiving unit 701, a serving AP quality calculating unit 704, a neighbor AP quality calculating unit 705, a handoff unit 706 and an extended beacon frame parameter extracting unit 707.

Figure 8:
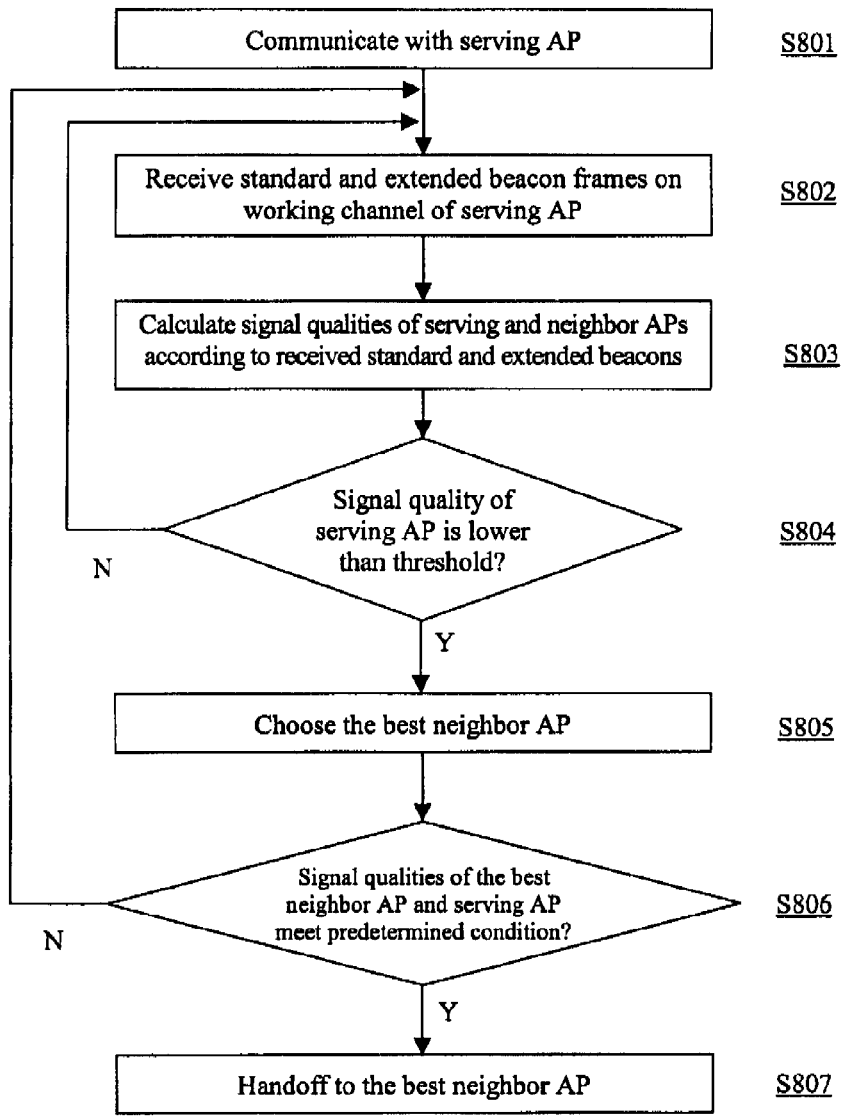
FIG. 8 is a flow chart schematically illustrating the operation of a user terminal according to one embodiment of the invention.

FIG. 8 is a flow chart of the operation of a user terminal according to one embodiment of the invention. During the period in which the STA communicates with the serving AP (step S801), the beacon frame receiving unit 701 of the STA receives beacon frames on the working channel of the serving AP of STA 700 (step S802). The received beacon frames include not only the standard beacon frames from the primary interface of the serving AP, but also the extended beacon frames from the secondary interfaces of the neighbor APs. The standard beacon frames are acquired by a standard beacon frame acquisition part 702 in the beacon frame receiving unit 701, and the extended beacon frames are acquired by an extended beacon frame acquisition part 703 in the beacon frame receiving unit 701. Then, the serving AP quality calculating unit 704 calculates the signal quality of the serving AP from the acquired standard beacon frames, and the neighbor AP quality calculating unit 705 calculates the signal qualities of the neighbor APs from the acquired extended beacon frames (step S803). The handoff unit 706 monitors the signal quality of the serving AP (step S80). If the signal quality of the serving AP keeps good ("N" in step S804), the STA maintains the communication with the serving AP and does not perform handoff, and the process goes back to step S802. If the signal quality of the serving AP drops below a threshold ("Y" in step S804), the handoff unit 706 chooses the best neighbor AP according to the calculation results of the neighbor AP quality calculating unit 705 (step S805). Then, the handoff unit 706 determines whether the signal qualities of the best neighbor AP and the serving AP meets a predetermined relation, e.g., the signal quality of the best neighbor AP is higher than the signal quality of the serving AP by a predetermined margin (step S806). If the condition is met, the handoff unit 706 performs handoff from the current serving AP to the best neighbor AP (step S807). Otherwise, the STA keeps communication with the serving AP and the process goes back to step S802.

To make the equation (1) reasonable, STA had better to receive standard beacons from its server AP and extended beacons from its neighbor APs at the same interval. The primary interface keeps broadcasting standard beacons at a fixed frequency (100 ms beacon interval by default), and the secondary interface should broadcast extended beacons at a much higher frequency, for that the secondary interface has to broadcast on multiple channels sequentially. It is preferable that in one period of the standard beacon frame of every neighbor AP, the secondary interface of the serving AP sends one extended beacon frame on the working channel of that neighbor AP.

If the whole network is based on 802.11b/g technology and only non-overlapped channels (1, 6 and 11) are used to provide the coverage, AP just needs to send extended beacon frames on the two channels which are different from the working channel of its primary interface. However, if all channels of 802.11b/g are used or the network is based on 802.11a technology, it is difficult for the secondary interface to broadcast extended beacons on a special channel with the same interval of standard beacons. Sending extended beacons with very short intervals also puts heavy overhead on the CPU of the AP. If knowledge of which channels the neighbor APs work on can be obtained in advance, the broadcast frequency for the extended beacons can be lowered.

According to an improved embodiment of the invention, neighbor list is used to reduce the number of channels on which a secondary interface broadcasts extended beacons, and the sending interval for the extended beacons is adjusted adaptively.

FIG. 6 shows an example of the neighbor list. The neighbor list of an AP keeps the records of its neighbor APs, and each record includes at least a first field identifying a neighbor AP (BSSID of the neighbor AP, namely, the MAC address of the primary interface) and a second field identifying the working channel of that neighbor AP (namely, the channel of the primary interface). The neighbor list may further comprise other information of the neighbor APs, such as standard beacon period and so on. In the example shown in FIG. 6, three neighbor APs are present, operating on channel 2, 6, and 9, respectively. The neighbor list can be built by the serving AP or the backbone infrastructure behind the serving AP (such as an Ethernet switch, a special server, and the like). The methods to built neighbor list include manual pre-configuration, recording the STAs' past movement and handoff history, future protocol standard—802.11k, and so on.

With neighbor list, an AP can acknowledge the set of channels on which its neighbor APs are operating. The AP switches its secondary interface to the working channels of the primary interfaces in the neighbor list sequentially. According to Reference 8, by using the information about neighbor APs, the number of neighbors that need to be probed can be reduced to 3.15 on average, with a maximum of 6, while the average neighbor channel count is 2.25. Therefore, the average number of channels, on which the secondary interface needs to broadcast extended beacons, is much less than the number of the available channels in the 802.11 standard.

The AP according to one embodiment of the invention may be configured to adjust adaptively the sending interval of the extended beacons according to the standard beacon period of the neighbor APs and the number of working channels of all neighbor APs. That is, in one period of the standard beacon frame of every neighbor AP, the secondary interface of the serving AP sends one extended beacon frame on the working channel of that neighbor AP. For example, if the interval of the standard beacons from the primary interfaces of all neighbor APs is T (about 100 ms by default), and by building a neighbor list, it is known that neighbor APs works on M channels, the interval of the extended beacons from the secondary interface of the serving AP can be calculated as T/M. In the case that the periods of the standard beacons from the primary interfaces of the neighbor APs are different, the secondary interface may be also made to send, in one period of the standard beacon frame of every neighbor AP, one extended beacon frame on the working channel of that neighbor AP, by proper calculation.

FIG. 10 shows the configuration of an AP taking use of the neighbor list according to one embodiment of the invention. In FIG. 10, the like parts as those in FIG. 6 are denoted by the same reference numerals. AP 1000 in FIG. 10 is added with a neighbor list storage unit 1001 for storing a neighbor list, and a broadcast interval setting unit 1002 for adjusting the broadcast interval of the extended beacon frames, which are coupled with the secondary interface 601

FIG. 11 is a flow chart of the operation of AP 1000. As shown in the drawing, after startup, AP 1000 reads the neighbor list from the neighbor list storage unit 1001 (step S1101). Then, the secondary interface 602 derives the working channels of the neighbor APs from the neighbor list (step S1102). The broadcast interval setting unit 1002 calculates the broadcast interval of the extended beacon frames according to the number of the working channels of the neighbor APs and the intervals of standard beacons of the neighbor APs (step S1103). After the standard and extended beacon frames are generated by the standard beacon frame generating unit 603 and the extended beacon frame generating unit 604 (step S1104), AP 1000 communicates with STAs via the primary interface 601, broadcasts the standard beacon frames on the working channel of itself, and broadcasts the extended beacon frames sequentially on the neighbor APs' working channels determined according to the neighbor list via the secondary interface 602 (step S1105).

In summary, the following effects are achieved by application of the invention.

By another wireless interface installed, an AP can continuously broadcasts its beacons on different channels, and a STA can monitor beacons from its serving AP and its neighbor APs without switching its communication channel. Therefore, the time-consuming scanning process during handoff can be realized before the STA breaks its current connection, and the handoff latency can be reduced below 20 ms.

The most task of handoff is immigrated into APs, and minimal modification is needed on client terminal. This makes the system more deployable.

A new format of beacon frame is suggested, with which the secondary interface can broadcast the information of its primary interface, such as BSSID, capacity information, SSID and working channel of the primary interface.

With the aid of neighbor list, the number of the channels, on which the secondary interface needs to broadcast extended beacons, is reduced. Thus, the CPU overhead of APs can be reduced.

STA uses passive mode (by monitoring the beacons from its serving AP and neighbor APs) to realize the scanning process. Thus the power consuming caused by handoff is minimized.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine-readable medium" may include any medium that can store or transfer information. Examples of a machine-readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. For example, step S1104 shown in FIG. 10 may be performed before step S1101. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for an access point to facilitate fast handoff of user terminals in a wireless communication network, comprising:

performing communication with user terminals within a coverage area of the access point through a primary interface of the access point;

broadcasting standard beacon frames on a working channel of the access point through the primary interface;

broadcasting extended beacon frames on working channels of one or more neighbor access points of said access point through a secondary interface of the access point;

adjusting a broadcast interval of the extended beacon frames according to a number of the working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point, wherein the extended beacon frame broadcast through the secondary interface includes information corresponding to the primary interface.

2. The method according to claim 1, wherein the extended beacon frame includes at least information of Basic Service Set Identifier, Service Set Identifier and the working channel of the primary interface.

3. The method according to claim 1, wherein broadcasting extended beacon frames further comprises determining the working channels of said one or more neighbor access points according to the neighbor list, and sequentially switching to the determined working channels of said one or more neighbor access points to broadcast the extended beacon frames.

4. The method according to claim 3, wherein each record in the neighbor list includes at least a first field identifying a neighbor access point and a second field identifying the working channel of that neighbor access point.

5. The method according to claim 1, wherein the frequency of broadcasting the extended beacon frames is higher than that of broadcasting the standard beacon frames.

6. The method according to claim 1, wherein the wireless communication network is a wireless local area network based on 802.11 standard.

7. An access point used in a wireless communication network, comprising:

a processor implementing a standard beacon frame generating unit configured to generate standard beacon frames;

an extended beacon frame generating unit configured to generate extended beacon frames;

a primary interface coupled with the standard beacon generating unit, the primary interface performing communication with user terminals within a coverage area of said access point and broadcasting the standard beacon frames on a working channel of said access point; and a secondary interface coupled with the extended beacon generating unit, the secondary interface broadcasting extended beacon frames on working channels of one or more neighbor access points of said access point, a broadcast interval setting unit coupled with the secondary interface, the broadcast interval setting unit adjusting broadcast interval of the extended beacon frames according to a number of the working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point, wherein the extended beacon frame broadcast through the secondary interface includes information corresponding to the primary interface.

8. The access point according to claim 7, wherein the extended beacon frame includes at least information of Basic Service Set Identifier, Service Set Identifier and the working channel of the primary interface.

9. The access point according to claim 7, further comprising a neighbor list storage unit coupled with the secondary interface, the neighbor list storage unit storing the neighbor list of said access point, wherein the secondary interface determines the working channels of said one or more neighbor access points according to the neighbor list, and sequentially switches to the determined working channels of said one or more neighbor access points to broadcast the extended beacon frames.

10. The access point according to claim 9, wherein each record in the neighbor list includes at least a first field identifying a neighbor access point and a second field identifying the working channel of that neighbor access point.

11. The access point according to claim 7, wherein the frequency of broadcasting the extended beacon frames by the secondary interface is higher than that of broadcasting the standard beacon frames by the primary interface.

12. The access point according to claim 7, wherein said access point is an access point of a wireless local area network based on 802.11 standard.

13. A method for handoff of a user terminal in a wireless communication network, comprising:

receiving standard beacon frames from a primary interface of a serving access point on a working channel of the serving access point;

receiving extended beacon frames from secondary interfaces of one or more neighbor access points on the working channel of the serving access point;

calculating signal quality of the serving access point from the received standard beacon frames;

calculating signal qualities of said one or more neighbor access points from the received extended beacon frames; and selectively performing handoff according to the calculation results of the signal qualities of said serving access point and said one or more neighbor access points, wherein the extended beacon frame broadcast through the secondary interface includes information corresponding to the primary interface, and wherein a broadcast interval of the extended beacon frames are adjusted according to a number of working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point.

14. The method according to claim 13, further comprising deriving, from any one of the extended beacon frames, at least Basic Service Set Identifier, Service Set Identifier and the working channel of the primary interface of the corresponding neighbor access point.

15. The method according to claim 13, wherein calculating signal quality of the serving access point comprises calculating a moving average of Received Signal Strength Indicator of the serving access point according to multiple standard beacon frames.

16. The method according to claim 13, wherein calculating signal qualities of said one or more neighbor access points comprises calculating a moving average of Received Signal Strength Indicator of one neighbor access point according to multiple extended beacon frames corresponding to that neighbor access point.

17. The method according to claim 13, wherein selectively performing handoff comprises:

selecting a best neighbor access point according to the signal qualities of said one or more neighbor access points when the signal quality of the serving access point is lower than a predetermined threshold; and performing handoff from the serving access point to the best neighbor access point when the signal quality of the best neighbor access point is higher than the signal quality of the serving access point by a predetermined margin.

18. The method according to claim 13, wherein the standard beacon frames and the extended beacon frames are received by the same interface.

19. The method according to claim 13, wherein the wireless communication network is a wireless local area network based on 802.11 standard.

20. A terminal used in a wireless communication network, comprising:
   a processor implementing a beacon frame receiving unit that receives beacon frames on a working channel of a serving access point of the terminal, the beacon frame receiving unit comprising:
   a standard beacon frame acquisition part that acquires, from the received beacon frames, standard beacon frames from a primary interface of the serving access point; and
   an extended beacon frame acquisition part that acquires, from the received beacon frames, extended beacon frames from secondary interfaces of one or more neighbor access points;
   a serving access point quality calculating unit coupled with the standard beacon frame acquisition part, the serving access point quality calculating unit calculating signal quality of the serving access point from the acquired standard beacon frames;
   a neighbor access point quality calculating unit coupled with said extended beacon frame acquisition part, the neighbor access point quality calculating unit calculating signal qualities of said one or more neighbor access points from the acquired extended beacon frames; and
   a handoff unit coupled with said serving access point quality calculating unit and said neighbor access point quality calculating unit, the handoff unit selectively performing handoff according to the signal qualities of said serving access point and said one or more neighbor access points calculated by the serving access point quality calculating unit and the neighbor access point quality calculating unit,
   wherein the extended beacon frame broadcast through the secondary interface includes information corresponding to the primary interface,
   wherein a broadcast interval of the extended beacon frames are adjusted according to a number of working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point.

21. The terminal according to claim 20, further comprising an extended beacon frame parameter extracting unit coupled with said extended beacon frame acquisition part and said handoff unit, for extracting, from any one of the extended beacon frames, at least Basic Service Set Identifier, Service Set Identifier and the working channel of the primary interface of the corresponding neighbor access point.

22. The terminal according to claim 20, wherein the serving access point quality calculating unit calculates a moving average of Received Signal Strength Indicator of the serving access point according to multiple standard beacon frames.

23. The terminal according to claim 20, wherein the neighbor access point quality calculating unit calculates a moving average of Received Signal Strength Indicator of one neighbor access point according to multiple extended beacon frames corresponding to that neighbor access point.

24. The terminal according to claim 20, wherein the handoff unit selects a best neighbor access point according to the signal qualities of said one or more neighbor access points when the signal quality of the serving access point is lower than a predetermined threshold, and performs handoff from the serving access point to the best neighbor access point when the signal quality of the best neighbor access point is higher than the signal quality of the serving access point by a predetermined margin.

25. The terminal according to claim 20, wherein the beacon frame receiving unit receives the standard beacon frames and the extended beacon frames by the same interface.

26. The terminal according to claim 20, wherein the terminal is a user terminal used in a wireless local area network based on 802.11 standard.

27. A method for a wireless communication system, the wireless communication system comprising a plurality of access points and at least one user terminal, each one of the plurality of access points comprising a primary interface and a secondary interface, the method comprising:
   performing communication by a serving access point, to which the user terminal is currently connected, with the user terminal through its primary interface;
   broadcasting standard beacon frames by the serving access point on a working channel of the serving access point through its primary interface;
   broadcasting extended beacon frames by one or more neighbor access points of the serving access point on the working channel of the serving access point through secondary interfaces of said one or more neighbor access points;
   adjusting a broadcast interval of the extended beacon frames according to a number of the working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point,
   receiving the standard beacon frames from the serving access point on the working channel of the serving access point by the user terminal;
   receiving the extended beacon frames from said one or more neighbor access points on the working channel of the serving access point by the user terminal;
   calculating signal quality of the serving access point from the received standard beacon frames by the user terminal;
   calculating signal qualities of said one or more neighbor access points from the received extended beacon frames by the user terminal; and
   selectively performing handoff by the user terminal according to the calculation results of the signal qualities of said serving access point and said one or more neighbor access points,
   wherein the extended beacon frame broadcast through the secondary interface includes information corresponding to the primary interface.

28. The method according to claim 27, wherein the extended beacon frame includes at least information of Basic Service Set Identifier, Service Set Identifier and the working channel of the primary interface.

29. The method according to claim 27, wherein broadcasting extended beacon frames further comprises determining working channels of said one or more neighbor access points according to the neighbor list, and sequentially switching to the determined working channels of said one or more neighbor access points to broadcast the extended beacon frames.

30. The method according to claim 27, wherein the method is used in a wireless local area network based on 802.11 standard.

31. A wireless communication system, comprising:
a plurality of access points and at least one user terminal, wherein
each one of the plurality of access points comprises:
a primary interface that performs communication with user terminals within a coverage area of the access point and broadcasts standard beacon frames on a working channel of the access point;
a secondary interface that broadcasts extended beacon frames on working channels of one or more neighbor access points of said access point;
a broadcast interval setting unit coupled with the secondary interface, the broadcast interval setting unit adjusting broadcast interval of the extended beacon frames according to a number of the working channels of said one or more neighbor access points and based on intervals of standard beacons of said one or more neighbor access points which are stored in a neighbor list, such that in one period of standard beacon frame of each neighbor access point, one extended beacon frame is sent on the working channel of that neighbor access point, and
the user terminal is wirelessly coupled to a serving access point among the plurality of access points, and comprises:
a beacon frame receiving unit that receives standard beacon frames from a primary interface of the serving access point and extended beacon frames from secondary interfaces of one or more neighbor access points of the serving access point on a working channel of the serving access point;
a processor implementing a serving access point quality calculating unit that calculates signal quality of the serving access point from the standard beacon frames;
a neighbor access point quality calculating unit that calculates signal qualities of said one or more neighbor access points from the extended beacon frames; and
a handoff unit that selectively performs handoff according to the signal qualities of said serving access point and said one or more neighbor access points,
wherein the extended beacon frame broadcast through the secondary interface includes information corresponding to the primary interface.

32. The system according to claim 31, wherein the extended beacon frame includes at least information of Basic Service Set Identifier, Service Set Identifier and the working channel of the primary interface of the corresponding access point.

33. The system according to claim 31, wherein each one of the plurality of access points further comprises a neighbor list storage unit that stores the neighbor list of the access point, and wherein the secondary interface determines the working channels of said one or more neighbor access points according to the neighbor list and sequentially switches to the determined working channels of said one or more neighbor access points to broadcast the extended beacon frames.

34. The system according to claim 31, wherein the system adopts 802.11 standard for the wireless communication.

35. A manufactured article having a non-transitory computer readable medium with instructions recorded thereon, which, when executed by an access point in a wireless communication system, causes the access point to:
perform communication with user terminals within a coverage area of the access point through a primary interface of the access point;
broadcast standard beacon frames on a working channel of the access point through the primary interface;
broadcast extended beacon frames on working channels of one or more neighbor access points of said access point through a secondary interface of the access point;
adjust a broadcast interval of the extended beacon frames according to a number of the working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point,
wherein the extended beacon frame broadcast through the secondary interface includes information corresponding to the primary interface.

36. A manufactured article having a non-transitory computer readable medium with instructions recorded thereon, which, when executed by an user terminal in a wireless communication system, causes the user terminal to:
receive standard beacon frames from a primary interface of a serving access point on a working channel of the serving access point;
receive extended beacon frames from secondary interfaces of one or more neighbor access points on the working channel of the serving access point;
calculate signal quality of the serving access point from the received standard beacon frames;
calculate signal qualities of said one or more neighbor access points from the received extended beacon frames; and
selectively perform handoff according to the calculation results of the signal qualities of said serving access point and said one or more neighbor access points,
wherein the extended beacon frame broadcast through the secondary interface includes information corresponding to the primary interface,
wherein a broadcast interval of the extended beacon frames are adjusted according to a number of working channels of said one or more neighbor access points and based on intervals of standard beacons of said one or more neighbor access points, which are stored in a neighbor list, such that in one period of standard beacon frame of each neighbor access point, one extended beacon frame is sent on the working channel of that neighbor access point.

* * * * *

UNITED STATES PATENT AND TRADEMARK OFFICE
CERTIFICATE OF CORRECTION

PATENT NO. : 8,023,468 B2
APPLICATION NO. : 11/850969
DATED : September 20, 2011
INVENTOR(S) : Yongqiang Liu, Yanfeng Zhang and Yong Xia It is certified that error appears in the above-identified patent and that said Letters Patent is hereby corrected as shown below:

Column 2, Line 43: Delete "LANs."" and insert -- LANs," --, therefor

Column 3, Line 43: Delete "Inforamtion" and insert -- Information --, therefor

Column 4, Line 50: Delete "full" and insert -- fully --, therefor

Column 7, Line 54: Delete "Ap3," and insert -- AP3, --, therefor

Column 10, Line 8: Delete "S80)." and insert -- S804). --, therefor

Column 11, Line 42: Delete "601" and insert -- 602. --, therefor

Column 17, Line 29 (approx.): In Claim 31, delete "points" and insert -- points, --, therefor Signed and Sealed this
Eleventh Day of September, 2012

David J. Kappos
*Director of the United States Patent and Trademark Office*